UNITED STATES PATENT OFFICE.

WILLIAM D'ROHAN, OF DENVER, COLORADO, ASSIGNOR OF SEVENTY-FIVE ONE-HUNDREDTHS TO ISAAC W. BECKER, OF DENVER, COLORADO.

FIREPROOFING STARCH.

1,248,092.  Specification of Letters Patent.  Patented Nov. 27, 1917.

No Drawing.  Application filed May 26, 1916.  Serial No. 100,131.

*To all whom it may concern:*

Be it known that I, WILLIAM D'ROHAN, a subject of the King of Great Britain, residing at Denver, in the county of Denver and State of Colorado, have invented certain new and useful Improvements in Fireproofing Starches, of which the following is a specification.

My invention relates to new and useful improvements in starch compositions, the primary object of my invention being the provision of a starch composition which will render fabrics upon which it is employed fire proof and which will, at the same time, possess all the advantages of other starches and starch compositions now in use, such as the stiffening of fabrics and the imparting of a gloss to the fabrics when they are ironed.

A still further object of my invention consists in providing a starch composition susceptible of a wide range of uses, such as its employment as a fire proof mucilage or paste, as a sizing for paper, which will also render the paper uninflammable, as a powdering for forms in casting and foundry work, as a composition for treating calicoes, linens and cottons during their printing to render them uninflammable and as an ingredient of oil paints, varnishes, water washes and the like to cause such coating liquids to render the surfaces painted uninflammable.

A still further object of my invention consists in providing a starch composition which is both antiseptic and aseptic and which will freshen up and restore the colors in colored goods.

Another object which I have in view is the manufacture of a starch composition which may be put up in either powder or liquid form and which will keep indefinitely in either form.

My improved starch composition, when used upon bedding, hangings and the like will also stop the inroads of bedbugs, fleas and similar vermin.

My improved starch composition also stiffens, glosses, whitens and both mechanically and chemically fireproofs fabrics to which it is applied, facilitates smooth ironing of the fabrics and if the fabrics are colored, freshens or brings out the colors. Broadly speaking, my starch composition includes certain stiffening ingredients, certain gloss imparting ingredients, certain mechanical fireproofing ingredients, certain chemical fire-proofing ingredients, and certain whitening and color freshening ingredients.

The following is one example of a starch composition formed in accordance with my invention and found to be very successful. The proportions may, however, be varied to a considerable extent and substitutes for many of the ingredients may be employed and many other ingredients may be added as adulterants without departing from the spirit of my invention, the specific ingredients employed in each case being to a more or less extent dependent upon the specific purpose for which the resultant starch composition is to be employed.

| | |
|---|---|
| Acetyl arabin | 5 ozs. |
| Amylum | 50 ozs. |
| Sodium thiosulfate | 40 ozs. |
| Sodium chlorid | 40 ozs. |
| Borax | 40 ozs. |
| A salt or salts of ammonium | 10 ozs. |
| A salt or salts of aluminum | 15 ozs. |
| White wax | 15 drs. |

The acetyl arabin and amylum form the principal stiffening ingredients of the composition, although the former also causes the composition to form a gloss upon the articles treated when they are ironed. The sodium thiosulfate serves a multitude of purposes, acting as a vermin exterminator, rendering the composition antiseptic and aseptic and also acting as a fire-proofing agent. The sodium chlorid and borax both act as fire-proofing agents, while the latter also acts as a cleaning agent and further reacts with the acetyl arabin in saponifying it and precipitating it in the form of a soluble gum which, under the heat of an iron, will produce the desired glossy surface upon the fabrics treated. The ammonium salt or salts act to render the material treated water and fire-proof and in case of colored fabrics to freshen the colors, this water proofing being done by the action of the ammonium salt in connection with the aluminium salt or salts and the acetyl arabin and amylum, rendering these compounds more insoluble or coöperating with them to form insoluble salts or precipitates, the specific actions or reactions, of course, being dependent upon the specific salts employed. The aluminum salt or salts act as fire and water proofing agents and also serve to freshen the colors in colored goods. The white wax is, of course, employed to facilitate the ironing of the goods and to create the desired smooth and glossy surface or finish thereon. All of the above ingredients are employed in finely powdered form and are, of course, thoroughly mixed together. The resultant starch composition may be either put upon the market in this powdered form or may be combined with water and put upon the market in liquid form, the composition keeping indefinitely in either form.

As previously mentioned, many substitutes may be employed for certain of the ingredients given in the above formula, some of the names of the ingredients there given being in a way generic. For instance, the amylum mentioned in the formula is meant to cover any form of starch whatsoever, such as corn starch, potato starch, rice flour, and farina.

The acetyl arabin may in part be replaced by certain substitutes or adulterants, such as saccharin, gum tragacanth, gelatin or sugar.

The white wax may be replaced in whole or in part by any one or more of the following—paraffin wax or spermaceti.

To the best of my knowledge, any ammonium salt, soluble in water, may be employed to advantage and I will, therefore, not attempt to enumerate all of such salts. Preferably ammonium bicarbonate or ammonium chlorid is employed, but ammonium borate, tungstate, phosphate and ammonium hydrate have been found efficient. Ammonium chlorid, if used, is, in itself, a good chemical fire-proof agent, developing heavy gases under heat which shut off the burning article from air and thus smother any flames. The bicarbonate however, in connection with the sodium chlorid, will not only, in itself, act as a fire-proofing agent, but will also generate the ammonium chlorid and is, therefore, preferable.

Practically any aluminum salt or salts may be employed, their purpose being to render the material treated by the starch composition fire and water proof. For instance, not only feldspar but also the various clays, such as kaolin or china clay, bauxite, cryolite, fire clay, pipe clay and potters' clay may be employed. Preferably, however, I use one of the so-called alums, aluminum sulfate being, everything considered, the best, although ammonia alum or soda alum are good.

The sodium thiosulfate reacting with the hydrochloric acid formed in the starch solution, and with the carbonic acid of the air, will deposit sulfur in the fibers of the fabric. The aluminum sulfate reacting with the ammonium and sodium compounds in the starch solution, together with the action of heat when the starch is boiled, or the heat supplied by the hot iron in ironing deposits alumina in a fine powder in the fiber of the cloth.

A portion of the borax or of the sodium thiosulfate may be replaced by sodium hyposulfite, if desired, as the sodium hyposulfite will act in the same manner as the borax to saponify the acetyl arabin.

In addition to the above ingredients, certain chemical fire-proofing agents, such as various salts of calcium, sodium carbonate, sodium bicarbonate, zinc chlorid and zinc sulfid, may be employed and certain mechanical fire-proofing agents, such as magnesium sulfate which, with borax, will form an insoluble borate, silicon phosphate which forms a sort of glass powder or mechanical pore filler or zinc oxid which will whiten fabrics starched and which, with the borax, forms a sort of fire-proofing and water-proofing glass.

Furthermore, certain ingredients may be put into the starch composition for cleaning purposes, such as saponin and potassium carbonate. Metaphosphoric acid may also be employed as it will neutralize alkalies in the starch composition and so preventing fading of colored goods.

Cheaper grades of fire and water-proof starch may be made by adding certain adulterants which, in some instances, act as artificial whiteners and fillers and in some instances merely as fillers, in either case acting as fire-proofing agents in that they are uninflammable. Talc, calcium chlorid and calcium sulfid are among those which whiten as well as act as fillers, while sodium dioxid, magnesium chlorid, sodium silicate, potassium silicate, calcium sulfate, barium oxid, barium nitrate, silica and chalk serve merely as fillers, if employed.

As white clothes and fabrics are nearly always rinsed in bluing water to whiten them before starching, I preferably provide my starch composition with a small quantity of bluing to avoid this otherwise necessary rinsing. This bluing may be in the form of Prussian blue or indigo blue, as preferred, and in the formula which I have given is not mentioned as all starch compositions will not contain it as, for instance, compositions intended for use with paints.

As will have been noted from the foregoing description, certain of the various ingredients mentioned, when employed in connection with each other, produce certain of the other ingredients mentioned and it will, of course, be appreciated that, under such circumstances, no additional quantities of the produced compounds will be added.

The acetyl arabin is superior to gum arabic in that it is a white amorphous powder which may be more readily mixed with the other ingredients of the composition, but which is saponified in the starch solution to create the desired gum. By adding a suitable wax, such as white wax, spermaceti or paraffin to the composition, in powdered form, the ironing of starched fabrics is greatly facilitated, these powdered waxes being melted in the hot starch solution cover the starched article with an imperceptible coating which, under the heat of an iron, produces a uniform gloss all over the fabric instead of in spots as is the case when the iron is rubbed with wax, according to the usual practice.

The above described composition not only serves as a fire and water-proof starch, but also as a fire-proof mucilage or paste and as a fire-proofing sizing for paper. It is also suitable for powdering forms in casting and foundry work and in printing fabrics to render them uninflammable. It will keep indefinitely in either powder or liquid form and if about 10% by weight of the composition be added to any paint, varnish or wash, the surface coated will be rendered fire-proof. Furthermore, my improved starch composition may be employed in connection with other starch to render it fire-proof. For instance, a pound for pound mixture of ordinary starch and my starch composition will produce a good fire-proofing starch composition.

If the starch composition includes sodium thiosulfate and aluminum sulfate, potassium nitrate may be added with good results as, under the action of heat, the sulfuric acid formed from the aluminum sulfate, together with the carbon produced by the cellulose of the burning material to which the starch has been applied, will produce sulfur dioxid. A starch of this character therefore forms a good fire extinguisher in powdered form.

If the starch composition contains silicates of soda and potash, the starch will also be capable of removing oil and grease stains.

Having thus described the invention, what is claimed as new is:

1. A fire-proofing starch comprising acetyl arabin, amylum, sodium thiosulfate, sodium chlorid, borax, an ammonium salt, an aluminum salt, and white wax.

2. A fire-proofing starch comprising acetyl arabin, corn starch, sodium thiosulfate, sodium chlorid, borax, an ammonium salt, an aluminum salt, and a wax.

3. A fire-proofing starch comprising acetyl arabin, amylum, sodium thiosulfate, sodium chlorid, borax, an ammonium salt, an aluminum salt, and a wax.

4. A fire-proofing starch comprising acetyl arabin, amylum, sodium thiosulfate, sodium chlorid, borax, ammonium bicarbonate, an aluminum salt, and a wax.

5. A fire-proofing starch comprising acetyl arabin, amylum, sodium thiosulfate, sodium chlorid, borax, an ammonium salt, an alum, and a wax.

6. A fire-proofing starch comprising acetyl arabin, amylum, sodium thiosulfate, sodium chlorid, borax, an ammonium salt, aluminum sulfate, and a wax.

7. A fire-proofing starch comprising acetyl arabin, amylum, sodium thiosulfate, sodium chlorid, borax, ammonium bicarbonate, an alum, and a wax.

8. A fire-proofing starch comprising acetyl arabin, amylum, sodium thiosulfate, sodium chlorid, borax, ammonium bicarbonate, aluminum sulfate, and a wax.

9. A fire-proofing starch comprising acetyl arabin, amylum, sodium thiosulfate, sodium chlorid, borax, salts of ammonium and aluminum, and a wax.

10. A fire-proofing starch comprising acetyl arabin 5 ounces, corn starch 50 ounces, sodium thiosulfate 40 ounces, sodium chlorid 40 ounces, borax 40 ounces, ammonium bicarbonate 10 ounces, aluminum sulfate 15 ounces, and white wax 15 drams.

In testimony whereof I affix my signature.

WILLIAM D'ROHAN. [L. S.]